US012792719B2

(12) United States Patent
Givant et al.

(10) Patent No.: US 12,792,719 B2
(45) Date of Patent: Nov. 10, 2026

(54) SYSTEM AND METHOD FOR GENERATION OF UNIQUE DIGITAL SIGNATURE USING A NON-VOLATILE MEMORY BASED PHYSICAL UNCLONABLE FUNCTION

(71) Applicant: Infineon Technologies LLC, San Jose, CA (US)

(72) Inventors: Amichai Givant, Rosh-Ha'ain (IL); Yoav Yogev, Mazkeret-Batya (IL); Eduardo Maayan, Kfar Saba (IL); Yair Sofer, Tel-Aviv (IL); Shivananda Shetty, Fremont, CA (US); James Pak, Sunnyvale, CA (US)

(73) Assignee: Infineon Technologies LLC, San Jose, CA (US)

( * ) Notice: Subject to any disclaimer, the term of this patent is extended or adjusted under 35 U.S.C. 154(b) by 144 days.

(21) Appl. No.: 18/625,846

(22) Filed: Apr. 3, 2024

(65) Prior Publication Data

US 2025/0315170 A1 Oct. 9, 2025

(51) Int. Cl.

| | |
|---|---|
| ***G06F 21/44*** | (2013.01) |
| *G06F 3/06* | (2006.01) |
| *H04L 9/08* | (2006.01) |

(52) U.S. Cl.

CPC ............ *G06F 21/44* (2013.01); *G06F 3/0622* (2013.01); *G06F 3/0655* (2013.01); *G06F 3/0679* (2013.01); *H04L 9/0866* (2013.01)

(58) Field of Classification Search

CPC .... G06F 3/0622; G06F 3/0655; G06F 3/0679; G06F 21/44; G06F 21/32; H04L 9/0866; A61B 5/7275; A61B 5/742

See application file for complete search history.

(56) References Cited

U.S. PATENT DOCUMENTS

| | | | | |
|---|---|---|---|---|
| 8,495,431 B2 * | 7/2013 | Gebara | .................. G06F 21/44 714/36 | |
| 2015/0156021 A1 * | 6/2015 | Shiota | .................. H04L 9/0869 713/168 | |

(Continued)

OTHER PUBLICATIONS

U.S. Appl. No. 63/584,220, filed Sep. 21, 2023, Cheng; Meng-Sheng.*

(Continued)

*Primary Examiner* — Tan Doan

(57) ABSTRACT

A system and method are provided for generating a Physical Unclonable Function (PUF) for a semiconductor memory to a host processing system. Generally, the method involves allocating a number of memory cells in a memory device; performing a bitmap readout at a median threshold voltages ($V_T$) of cells to generate a multibit Binary Entropy String (BES). Unstable bits in the BES are identified, and a mask of cell locations associated with the unstable bits generated. The BES is multiplied with the mask to generate a Physical Unclonable Function (PUF) including a Binary String of stable bits, and error-correction performed on the Binary String to generate ECC data. The mask and ECC data are stored in the memory device, and are used to regenerate the PUF to authenticate and uniquely identity the memory device to a host processing system. Various methods for generating the mask are disclosed.

17 Claims, 8 Drawing Sheets

900

(56) References Cited

U.S. PATENT DOCUMENTS

| | | | | |
|---|---|---|---|---|
| 2018/0006813 A1* | 1/2018 | Van Der Leest | ........ | G09C 1/00 |
| 2024/0249757 A1* | 7/2024 | Gueta | .................. | G11C 7/1063 |
| 2025/0105173 A1* | 3/2025 | Chang | .................... | G11C 17/18 |

OTHER PUBLICATIONS

Eder, "Synthesis of a Semiconducting 2D Material for Novel Strong PUFs", 2022, 49 pages.

Kempf et al., Threshold voltage bitmap analysis methodology: Application to a 512KB 4nm Flash memory test chip, 2018 IEEE International Reliability Physics symposium (IRPS), 2018, 9 pages.

International Search Report and Written Opinion of the International Searching Authority for International Application No. PCT/US25/21880 dated Jun. 11, 2025; 8 pages.

* cited by examiner

| 1st Method | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| Address | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| | | | | | | | | | | | | | | | | | | | | | | | | | | | | | | | | |
| Read 1 | 0 | 1 | 0 | 1 | 1 | 1 | 1 | 1 | 1 | 0 | 1 | 0 | 0 | 1 | 1 | 1 | 0 | 0 | 0 | 0 | 0 | 1 | 1 | 1 | 0 | 0 | 1 | 0 | 0 | 1 | 1 | 1 |
| Read 2 | 0 | 1 | 0 | 1 | 1 | 1 | 1 | 1 | 1 | 0 | 1 | 1 | 1 | 1 | 1 | 1 | 0 | 0 | 1 | 0 | 0 | 1 | 0 | 1 | 0 | 0 | 0 | | 0 | 1 | 1 | |
| Read 3 | 0 | 1 | 0 | 1 | 1 | 1 | 1 | 1 | 1 | 0 | 1 | 1 | 1 | 1 | 0 | 1 | 0 | 0 | 1 | 0 | 0 | 1 | 0 | 1 | 0 | 1 | 1 | 0 | 0 | 1 | 1 | 1 |
| Read 4 | 0 | 1 | 0 | 1 | 1 | 1 | 1 | 1 | 1 | 0 | 1 | 0 | 1 | 1 | 1 | 1 | 0 | 1 | 0 | 0 | 1 | 1 | 0 | 1 | 0 | 1 | 0 | 0 | 0 | 1 | 1 | 1 |
| Read 5 | 0 | 1 | 0 | 1 | 1 | 1 | 1 | 1 | 1 | 1 | 1 | 1 | 1 | 1 | 0 | 1 | 0 | 1 | 0 | 0 | 1 | 1 | 1 | 1 | 1 | 1 | 0 | 0 | 0 | 1 | 1 | 1 |
| Fuzzy Mask | 1 | 1 | 1 | 1 | 1 | 1 | 1 | 1 | 1 | 0 | 1 | 0 | 0 | 1 | 0 | 1 | 1 | 0 | 0 | 1 | 0 | 1 | 0 | 1 | 0 | 0 | 0 | 1 | 1 | 1 | 1 | 1 |
| PUF | 0 | 1 | 0 | 1 | 1 | 1 | 1 | 1 | 1 | 0 | 1 | 0 | 0 | 1 | 0 | 1 | 0 | 0 | 0 | 0 | 0 | 1 | 0 | 1 | 0 | 0 | 0 | 0 | 0 | 1 | 1 | 1 |

FIG. 5

| 2$^{nd}$ Method | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| Address | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| Read Median+delta | 0 | 1 | 0 | 1 | 1 | 1 | 1 | 1 | 1 | 1 | 1 | 1 | 1 | 1 | 1 | 1 | 0 | 1 | 1 | 0 | 1 | 1 | 1 | 1 | 1 | 1 | 1 | 0 | 0 | 1 | 1 | 1 |
| Read Median-delta | 0 | 1 | 0 | 0 | 1 | 1 | 1 | 1 | 1 | 1 | 1 | 0 | 0 | 1 | 0 | 1 | 0 | 0 | 0 | 0 | 0 | 1 | 0 | 1 | 0 | 0 | 0 | 0 | 0 | 1 | 1 | 1 |
| Fuzzy mask | 1 | 1 | 1 | 0 | 1 | 1 | 1 | 1 | 1 | 1 | 1 | 0 | 0 | 1 | 0 | 1 | 1 | 0 | 0 | 1 | 0 | 1 | 0 | 1 | 0 | 0 | 0 | 1 | 1 | 1 | 1 | 1 |
| PUF | 0 | 1 | 0 | 0 | 1 | 1 | 1 | 1 | 1 | 1 | 1 | 0 | 0 | 1 | 0 | 1 | 0 | 0 | 0 | 0 | 0 | 1 | 0 | 1 | 0 | 0 | 0 | 0 | 0 | 1 | 1 | 1 |

*FIG. 8*

SYSTEM AND METHOD FOR GENERATION OF UNIQUE DIGITAL SIGNATURE USING A NON-VOLATILE MEMORY BASED PHYSICAL UNCLONABLE FUNCTION

TECHNICAL FIELD

This present disclosure relates generally to computer memories, and more particularly to systems and methods for generating and using a Non-Volatile Memory based Physical Unclonable Function (PUF) to uniquely identify and authenticate the memory to a host processing system for improved data security.

BACKGROUND

Many modern mechanical and electronic systems and devices include an embedded computer system or secure system to control operation of the system or device it is embedded within. An secure system typically includes a computer processor, a number of semiconductor memories, and a number of input/output interfaces to connect to peripheral devices in the larger mechanical or electronic system. Systems and devices including such secure systems include cars, smart factories, hospital equipment, and portable medical products. As more systems and devices including secure systems become internet or network connected and autonomous, the possibility of bad actors taking control of these systems and devices is of increasing concern.

One of the primary targets of hackers is the semiconductor memories, and in particular flash or other nonvolatile memory devices (NVM), which is used to store boot code, security keys, passwords and other critical data and log data that are used to keep the secure system functioning properly. Especially vulnerable are the latest generation of secure systems in which a need for larger or high performance memory has led to the NVM being implemented externally in a discrete, integrated circuit (IC) or device separate from the computer processor and other elements of the secure system, which are typically implemented as a host processing system on another IC or System on a Chip (SoC), and coupled to the NVM through a wired or wireless data bus.

There are many ways in which external NVM can be compromised including: snooping attacks during transactions to and from the NVM to extract unprotected system keys or passwords; stealing Security Keys during provisioning operations in an unsecure processing or fabrication facility when storage assets and keys are being programmed into the secure system; cloning in which hackers clone the NVM or other elements of the secure system to compromise the integrity of the secure system; and side-channel attacks to disclose contents of the NVM through interruptions of power or glitches.

Past approaches to secure systems have focused on supplying a unique identifier that is used to generate secret keys shared between the NVM and a host processing system. These have not been wholly satisfactory for a number of reasons. For example, the unique identifier is typically generated using an external entropy source or random number generator and programmed into the NVM at a fabrication facility for the secure system. Either the external entropy source or fabrication facility may or may not be secure. Likewise it is possible for the NVM to be hacked, cloned or otherwise compromised between the fabrication facility and a manufacturer of the system or device in which it is embedded.

Accordingly, there is a need for system and method for providing a unique identifier to semiconductor memories generated using an entropy source internal and unique to the memory device to enable a user or manufacturer of the system or device in which it is embedded to generate the unique identifier at their premises. It is further desirable that the entropy source used to generate the unique identifier is physically unclonable and reflects a 'fingerprint' or 'DNA' of the memory to a host processing system.

SUMMARY

A system and method are provided for generating a Physical Unclonable Function (PUF) for identifying and authenticating a semiconductor memory to a host processing system to improve data security. By PUF it is meant a unique, physically unclonable identifier generated at least in part by attributes arising from variations in the processes used to fabricate the memory, which can be used for generating security keys to control access to the memory.

Generally, the method begins at sorting of a fabricated memory device by the manufacturer with setting aside or allocating a number of memory cells in a memory device for creating or generating a PUF. The memory cells can include either native memory cells, or previously programmed and erased memory cells, which are rendered read-only after PUF generation. By native it is meant a memory cell that has not been programmed and is unwritten to since fabrication. A plurality of bitmap readouts of the number of allocated memory cells is performed at a median of a native threshold voltages ($V_T$) distribution of the cells to generate a first Binary Entropy String including a plurality of both stable and unstable binary bits. By unstable bit it is meant a bit read from a location (cell) in the number of allocated memory that can flip or change from a '1' to a '0' or vice-versa on subsequent bitmap readouts due to a proximity of the particular cell's native $V_T$ to the median. Next, the unstable bits in the Binary Entropy String are identified; a fuzzy mask or mask of memory cell location associated with the number of unstable bits is generated. The mask operable to cause the unstable bits on subsequent bitmap readouts to be ignored. Finally, the mask and the first Binary Entropy String are mathematically combined or multiplied to generate a Physical Unclonable Function (PUF) including a Binary String consisting of only stable bits, and an error correcting algorithm executed on the Binary String to generate Error Correction Code (ECC) data. By stable bits it is meant binary bits that will not flip or change from a '1' to a 'O' or a '0' to a '1' on a second or subsequent bitmap readouts. The mask and ECC data are stored in the memory device, and can be used to regenerate the PUF to authenticate and uniquely identity the memory device to a host processing system. Various methods for generating the mask are disclosed.

In one embodiment, identifying the unstable bits is accomplished by performing multiple, successive bitmap readouts of the number of allocated memory cells and identifying as unstable any bit read from a location (cell) in the number of allocated memory cells that have flipped or changed from that read in one of the preceding bitmap readouts. Generally, the number of bitmap readouts performed is predetermined by the manufacturer or a user, and can be from 2 to several hundred times that reflects a desired confidence level for allocating the unstable addresses. Additionally or optionally, the multiple, successive bitmap readouts can be performed at different memory device temperatures.

In another embodiment, identifying the unstable bits is accomplished by the manufacturer determining an upper and lower native threshold voltages ($V_T$) a predetermined distance or voltage from the median $V_T$ distribution of the cells, that is median+Δ and median−Δ, and performing two (2) successive bitmap readouts of the number of allocated memory cells, including one at median+Δ and one median−Δ. Any bit read from a location (cell) in the number of allocated memory that flips or changes from a '1' to a '0' or vice-versa in the two bitmap readouts is identified and marked as unstable.

The system or memory device to perform the above method includes an array of memory cells having a number of memory cells allocated for generating a Physical Unclonable Function (PUF); a microcontroller operable to execute algorithms; and a unique identifier storage in which the mask and ECC data stored for use in regenerating the PUF to authenticate and identify the memory device to a host processing system. Generally the microcontroller is operable to execute algorithms including: perform a plurality of bitmap readouts of the number of allocated memory cells at a median of a native threshold voltages ($V_T$) distribution of the number of allocated memory cells to generate a Binary Entropy String comprising a plurality of binary bits; identify a number of unstable bits in the Binary Entropy String; generate a mask of memory cell locations associated with the number of unstable bits, the mask operable to cause the number of unstable bits to be ignored on subsequent bitmap readouts of the number of allocated memory cells; mathematically combine the mask and the Binary Entropy String from one of the preceding bitmap readouts to generate the PUF, the PUF comprising a Binary String of stable bits; execute an error correcting algorithm on the Binary String to generate Error Correction Code (ECC) data; and regenerate the PUF using the mask and ECC data to authenticate and uniquely identity the memory device to a host processing system.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

FIG. 5 is a table illustrating a number of bitmap readouts of the allocated memory cell, a mask and a final PUF generated by the method of FIG. 4;

FIG. 8 is a table illustrating a bitmap readouts of allocated memory cells at the upper, median+Δ $V_T$ and lower, median−Δ $V_T$ used to generate a mask of unstable bits, and a final PUF for the memory device;

DETAILED DESCRIPTION

Figure 1B:
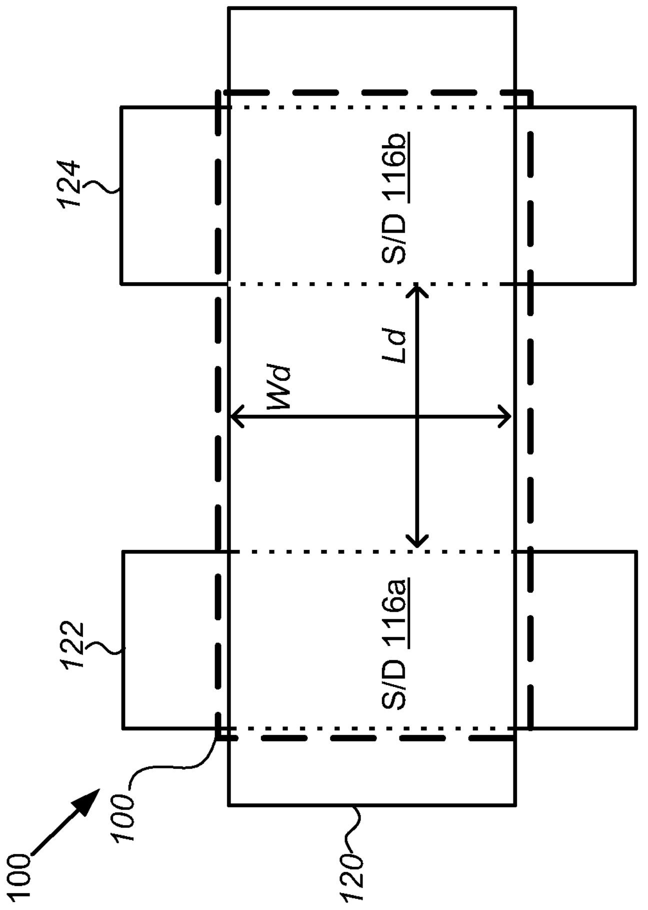
FIG. 1B is a block diagram illustrating a top view of the memory cell of FIG. 1A.

A system and methods are provided for generating and using a Physical Unclonable Function (PUF) for semiconductor memories to improve data security and reliability. The system and methods of the present disclosure are particularly useful for non-volatile or flash memories in secure systems used in autonomous internet or network connected systems and devices, such as cars, smart factories, hospital equipment, and portable medical products.

In the following description, for purposes of explanation, numerous specific details are set forth in order to provide a thorough understanding of the present invention. It will be evident, however, to one skilled in the art that the present invention can be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term to couple as used herein can include both to directly electrically connect two or more components or elements and to indirectly connect through one or more intervening components.

Briefly, variations in threshold voltages of allocated memory cells in a memory device arising from processes variations used to fabricate the memory device are translated and used to generate a Physically Unclonable Function (PUF) that can be subsequently used to authenticate and uniquely identity the memory device to a host processing system. By native it is meant a memory cell that has not been programmed and is unwritten to since fabrication. The variations in threshold voltages can arise from variations in production processes of the memory array that cause minor variations in physical and electrical characteristics of devices in the memory cells including wordline (WL) and bitline (BL) widths, channel lengths, capacitance of a gate oxide or dielectric ($C_{OX}$), implant uniformity and charging effects. Alternatively or additionally, instead of relying on variations of threshold voltages of native memory cells, similar approaches may be adopted using variations of threshold voltages of previously programmed and erased memory cells. In either embodiment, whether the number of memory cells allocated for PUF generation include only native memory cells or previously programmed and erased memory cells, after initial generation of the PUF, the allocated memory cells are rendered read-only, either by design and voltages used to write to the memory, or by opening of fusible links to the allocated memory cells.

Generally, the method involves sorting of a fabricated memory device by the manufacturer with setting aside or allocating a number of memory cells in a memory device for creating or generating a PUF. A plurality of bitmap readouts or otherwise regular read operations of the number of allocated memory cells is then performed at a median of a distribution of the native threshold voltages ($V_T$) of the allocated cells to generate a first Binary Entropy String including a plurality of both stable and 'fuzzy' or unstable binary bits. By unstable bit it is meant a bit read from a particular address or location (cell) in the number of allocated memory cells that can flip or change from a '1' to a '0' or vice-versa on subsequent bitmap readouts due to a proximity of the particular cell's native $V_T$ to the median. Next, the unstable bits in the Binary Entropy String are identified; a fuzzy mask or mask of memory cell locations associated with the number of unstable bits is generated. The mask is operable to cause the unstable bits on subsequent bitmap readouts to be ignored. Finally, the mask and the first Binary Entropy String are mathematically combined or multiplied to generate the PUF including a Binary String consisting of only stable bits. An error correcting algorithm is executed on the Binary String to generate Error Correction Code (ECC) syndrome bits or data for the Binary String. By stable bits it is meant binary bits that will not flip or change from a '1' to a '0' or a '0' to a '1' on a second or subsequent bitmap readouts. The mask and ECC data are stored in the memory device, and can be used to regenerate the PUF. The PUF can be used to create a unique identifier to authenticate and uniquely identity the memory device to a host processing system. Alternatively, in some embodiments the PUF itself can be used as the unique identifier. Various methods for generating the mask are disclosed.

Further details of these and other embodiments of the method and system will now be described in greater detail with reference to FIGS. 1A through 9.

Figure 1A:
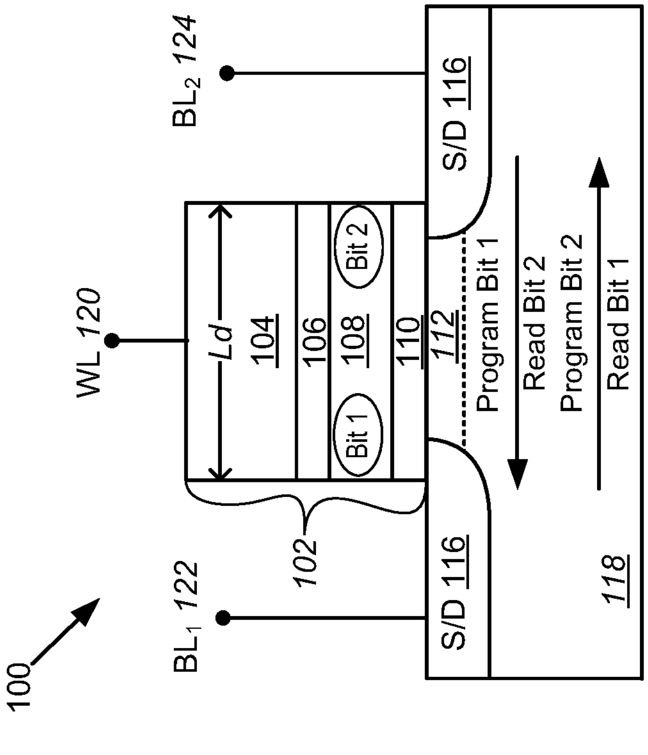
FIG. 1A is a block diagram illustrating a sectional side view of one embodiment of a memory cell in a flash or nonvolatile memory (NVM) device.

FIG. 1A is a block diagram illustrating a sectional side view of an embodiment of a single memory cell in a flash or nonvolatile memory (NVM) device for which the system and method of the present disclosure is especially useful. FIG. 1B is a block diagram illustrating a top view of the memory cell of FIG. 1A. More specifically, the memory cell illustrated in FIGS. 1A and 1B is a multibit MirrorBit™ memory cell (hereinafter "MirrorBit", manufactured by Infineon Technologies LLC of San Jose, California), in which the non-conducting nature of a charge-trapping layer allows a single memory transistor to store two spatially separated physical bits of data per cell (2BPC) of the memory device.

Referring to FIG. 1A the memory cell 100 generally includes a charge-trapping gate stack 102 including a control gate 104, an oxide-nitride-oxide or ONO layer made up of a top or blocking dielectric layer 106, a charge-trapping layer 108, and a bottom dielectric layer 110, formed over a channel 112 separating a source and drain regions (S/D 116) in a substrate 118. Through proper biasing the memory cell 100 can store two spatially separated physical bits (bit1 and bit2) as charges at opposite ends of the charge-trapping layer 108. These two independent physical bits (bit1 and bit2) can be independently read by running a current through the channel 112 in different directions as shown.

Referring to FIG. 1B the memory cell 100 further includes a wordline (WL 120) electrically coupled to the control gate 104, and a first bitline ($BL_1$ 122) electrically coupled to or formed by an implant of a source (S/D 116*a*), and a second bitline ($BL_2$ 124) electrically coupled to or formed by an implant of a drain (S/D 116*b*).

The actual threshold voltage ($V_{th}$) is the minimum gate-to-source voltage ($V_{GS}$) applied between the control gate 104 and source (S/D 116*a*) needed to create a conducting path between the source and drain (S/D 116*b*) in a particular memory cell 100. Generally, for semiconductor based NVM cells, and specifically in MirrorBit memory cells, the sensing threshold voltage ($V_T$) which is referred to the Vas required to obtain a pre-determined sensing drain current ($I_d$) is taken at a linear region where the gate-to-source voltage is greater than the threshold voltage ($V_{th}$), and a drain-to-source voltage ($V_{DS}$) is less than the difference between the gate-to-source voltage and threshold voltage. That is where: $V_{GS}>V_{th}$ and $V_{DS}<V_{GS}-V_{th}$. This ensures that a drain current ($I_d$) of the memory cell 100 will vary linearly with respect to the gate-to-source voltage ($V_{GS}$) according to the expression below.

$$I_D = \mu_a C_{ox}\frac{W}{L}\left((V_{GS} - V_{th})V_{DS} - \frac{V_{DS}^2}{2}\right)$$

where $C_{ox}$ corresponds to capacitance of the ONO layer, W is memory cell width determined by WL width (WD in FIG. 1B), and L is memory cell channel length (channel 112 in FIG. 1A) as determined by BL spacing (LD in FIGS. 1A and 1B).

It will be understood that the system and methods described below of using native variations in threshold voltages for memory cells as an entropy source for generation of a Physical Unclonable Function or PUF, while described in detail with respect to flash-type NVMs, and in particular charge-trapping types of NVM, can be applied to other types of nonvolatile memories exhibiting a random distribution in threshold voltages, including silicon-oxide-nitride-oxide-silicon (SONOS), metal-oxide-nitride-oxide-silicon (MONOS), split-gate and floating gate (FG) memories. It will further be understood the concepts can be extended to any NVM technologies, such as resistive random access memory (RRAM) technology, that can provide a random distribution having a median can be sensed, that is can provide sufficient current for sensing, and a sigma or variance that is wide enough to enable placing a reference of about a distribution median.

Briefly, a non-volatile memory array is characterized or read by applying a fixed voltage on the word lines connecting to the memory/control gates of each row of memory cells; and measuring the output current or drain current of each non-volatile memory cell. The current measurement may be performed by iteratively comparing the output current of each memory cell with an adjustable reference current using a sense amplifier to estimate the output current of the non-volatile memory cells. In some embodiments, these measurements may be made rapidly on a row-by-row basis using the existing sense amplifiers, read bus, and sense amplifier current reference circuitry of the non-volatile memory used during the normal read operation of the memory. The results of the comparison are indicative of the threshold voltage $V_T$ and binary state (programmed or erased) of the NVM cells.

Figure 2:
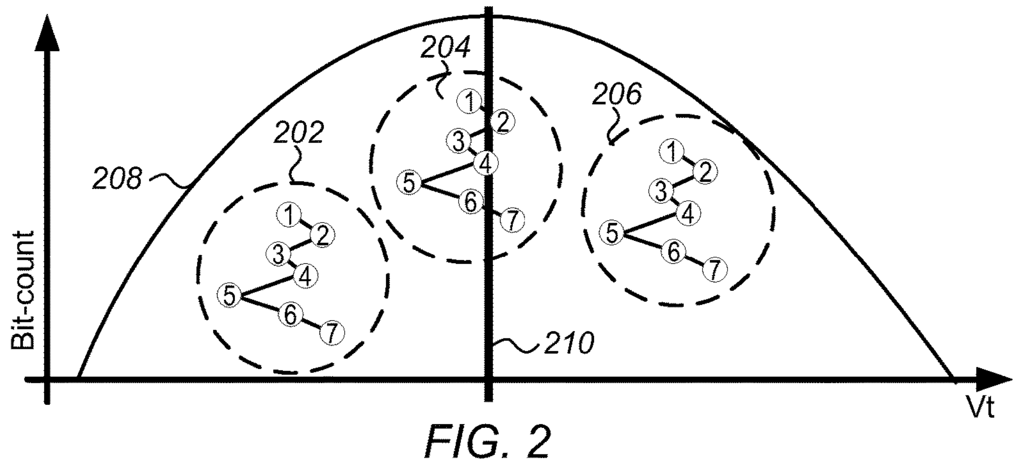
FIG. 2 is a histogram showing a number of successive readouts of logic values for a number of memory cells having a native $V_T$ distribution versus reference located at a median $V_T$ of the distribution.

FIG. 2 is a histogram schematically illustrating a native $V_T$ distribution for a number of memory cells allocated for PUF generation. Although for purposes of clarity FIG. 2 illustrates the native $V_T$ of just three (3) exemplary cells 202, 204 and 206, represented by large dashed circles, it will be understood the number of memory cells allocated for PUF generation is much greater, typically a number sufficient for storing from approximately 32 to approximately 4 kilobits (Kb) of binary data. Referring to FIG. 2 it is noted that the number of memory cells allocated for PUF generation will typically have a normal distribution of native $V_T$, represented by curve 208, and a median $V_T$ 210. The native $V_T$ for the three cells 202, 204 and 206, are found by applying a gate to source voltage or array voltage ($V_{GS}$), generally equal to the median $V_T$ 210, to gates of all three cells, and performing a bitmap readout of the cells by comparing a drain current ($I_d$) for each memory cell to a reference current ($I_{REF}$). If the drain current ($I_d$) for the cell is greater than the reference current ($I_{REF}$), than the cell is readout as a binary bit '1' and is characterized as having a $V_T$ less than the median $V_T$. If the drain current ($I_d$) for a cell is less than the reference current ($I_{REF}$), than the cell is readout as a binary bit '0' and is characterized as having a $V_T$ greater than the median $V_T$. In an alternative embodiment, binary bits '0' and '1' assignment may be reversed. For reasons explained above, cells 202, 204 and 206, will each have a native $V_T$ different from the median $V_T$ and, typically, from one another. Thus, reading out a large number of allocated memory cells using a the same Vas will result in a multibit, Binary Entropy String (BES), in which a particular bit value, '1' or '0' will randomly vary based on the variation in native $V_T$. However, it has been found that successive readouts of the same cells, with the same $V_{GS}$, can result in different drain currents, and will not reproduce a BES with exactly the same random bits, and therefore cannot be used as a (PUF) to uniquely identify a memory device to a host processing system.

Referring again to FIG. 2 seven (7) successive readouts, represented by small, solid circles numbered 1 through 7, were performed on each of the three cells 202, 204 and 206, by applying an array voltage ($V_{GS}$), equal to the median $V_T$, to gates of all three cells, and comparing a drain current ($I_d$) for each memory cell to a reference current ($I_{REF}$). If the resulting native $V_T$'s for a particular cell found by each readout are all distant from the median $V_T$, the bit readout will not change, and the bit stored at that memory cell address or location is said to be stable. For example, in cell 202 for each of the seven (7) successive bitmap readouts the native $V_T$ is found to be consistently less than the median $V_T$, resulting in a drain current ($I_d$) is greater than the reference current ($I_{REF}$), yielding a stable binary bit '1'. Similarly, the seven (7) successive bitmap readouts cell 206 consistently result in a stable binary bit '0'. However, for cell 204 successive readouts of result in binary bit '1' in the $1^{st}$, $3^{rd}$ and 6th readouts, and a binary bit '0' in the $2^{nd}$, 4th and 7th readouts due to a variations in the native $V_T$ near the median $V_T$. Such bits are referred to herein as 'fuzzy' or unstable bits. By unstable bit it is meant a bit read from a particular address or location (cell) in the number of allocated memory cells that can flip or change from a '1' to a '0' or vice-versa on subsequent bitmap readouts due to a proximity of the particular cell's native $V_T$ to the median. Thus, to enable a string of binary bits read from a number of allocated memory cells to be used to generate a PUF it is necessary to remove the uncertainty associated with successive bitmap readouts of fuzzy or unstable cells.

Figure 3:
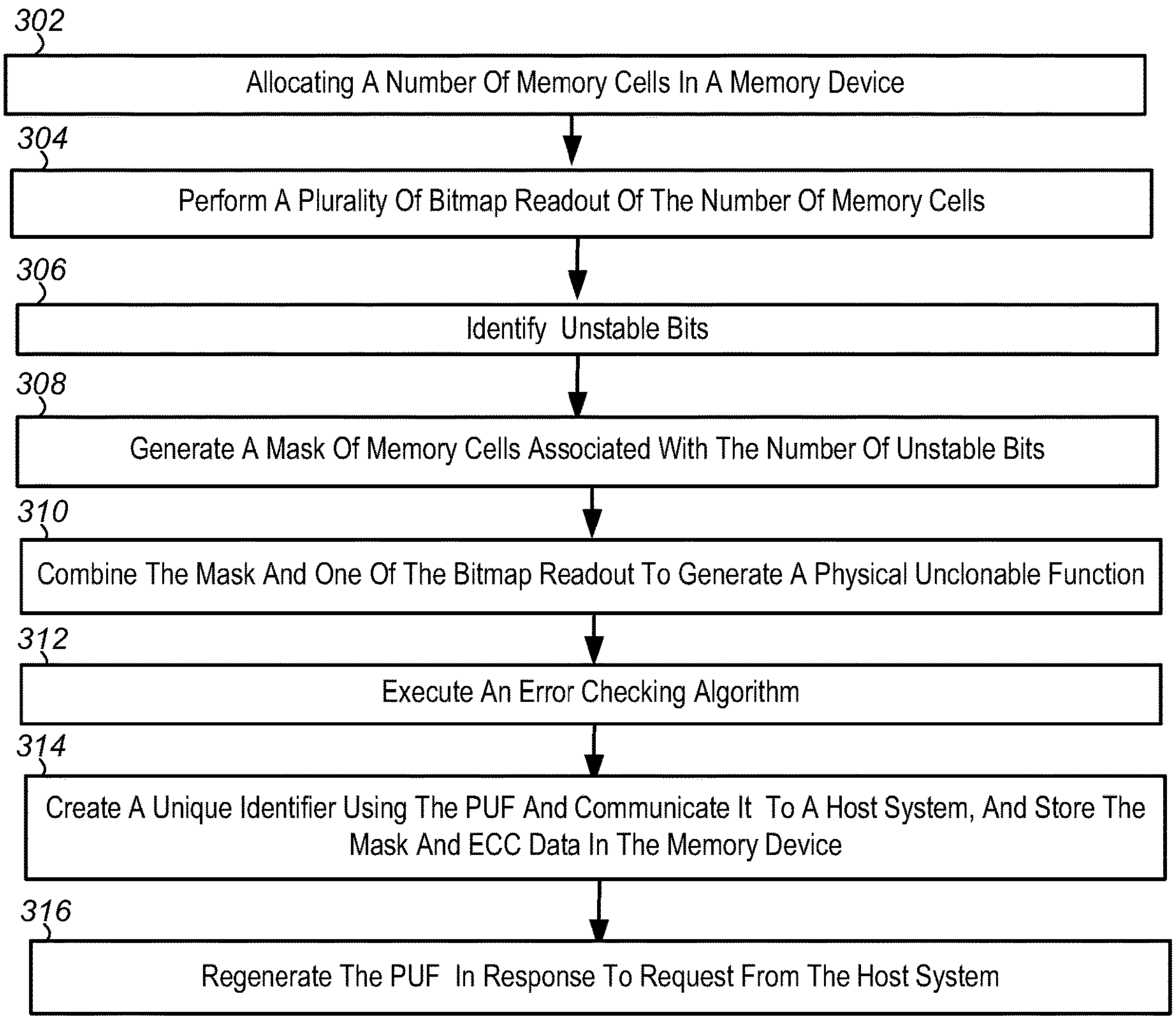
FIG. 3 is a flowchart illustrating a method for removing uncertainties associated with successive bitmap readouts of fuzzy or unstable cells to generate a Physically Unclonable Function (PUF) for identifying and authenticating the memory device to the host processing system to improve data security.

One method for doing so will now described with reference to the flowchart of FIG. 3. Referring to FIG. 3, the method begins with a manufacturer or user of the memory device allocating a number of memory cells in a memory device for use in generating a PUF (step 302). The allocation is performed once at sort or at final test of a system incorporating the memory by the manufacturer or at later point in time in the field by the user. The number of allocated memory cells, whether native memory cells or previously programed and erased memory cells, are made read-only, so that they cannot be accidentally programmed or erased in subsequent operations and rendered unsuitable for future PUF generation or recovery. The allocated memory cells can be made read-only by blowing or dramatically increasing the resistance of a link or fuse in a silicide or polysilicon layer of the allocated memory cells to prevent further programming or writing to the memory cells. Generally, blowing the fuse requires a DC pulse a few milliamps in amplitude and several microseconds in duration.

Next, a plurality of bitmap readouts of the number of allocated memory cells at a median of a native threshold voltages ($V_T$) distribution is performed to generate a multibit, Binary Entropy String (BES), including both a number of stable and unstable binary bits (step 304). The median of the native $V_T$ distribution can be found, for example, by scanning the bit values, that is a logic '0' or '1', of the number of allocated memory cells with increasing array voltages ($V_{GS}$) until a substantially equal number of '0s' and '1s' are read.

The unstable bits in the Binary Entropy String are then identified (step 306), and a mask (fuzzy mask) of memory cells in the number of allocated memory cells associated with the unstable bits in the BES generated (step 308). Generally, the mask is configured or operable to cause the unstable bits to be ignored on subsequent bitmap readouts of the number of allocated memory cells. The mask and the Binary Entropy String from one of the bitmap readouts, are then mathematically combined to generate a Physical Unclonable Function (PUF) including a Binary String of stable bits (step 310). In one embodiment, the mask includes a string of binary bits having a length or number of bits equal to that of the BES, where a value of bits in the mask (mask bits) corresponding to the location of unstable bits in the BES is a binary '0', and the mask bits corresponding to stable bits is a binary '1'. The mask and BES can then be multiplied together to produce a Binary String consisting only of stable bits in which all previously unstable bits in the BES are replaced by stable, binary '0' bits.

Generally, an error correcting algorithm is executed on the Binary String to generate a final PUF and ECC syndrome bits or data (step 312). This final PUF is then used to create a unique identifier, which is communicated to a host processing system where it is associated with the memory device, and the mask and ECC data—but not the stable Binary String or final PUF, are then stored in a secure, non-volatile location in the memory device (step 314). The PUF can be regenerated at a later time in response to a request from the host processing system (step 316).

Generally, the final PUF is combined with an output from additional random number generator in the memory device to create a secure unique identifier, which is communicated to a host processing system and used to securely identify the memory device to the host processing system. Alternatively, the final PUF can itself be used directly as the unique identifier. Because the mask eliminates uncertainty associated with unstable bits in any Binary Entropy String (BES) resulting from a subsequent bitmap readout of the allocated number of memory cells, and because the ECC data ensures that the previously stable bits in the BES have not changed or 'flipped', it is neither necessary, nor desirable for security reasons to store the stable Binary String or PUF in the memory device. The idea behind a PUF is to have a stable Binary String that is not directly stored in the memory device, but can be reliably reproduced or regenerated at a later time to uniquely identify and authenticate the memory device to the host processing system.

Figure 4:
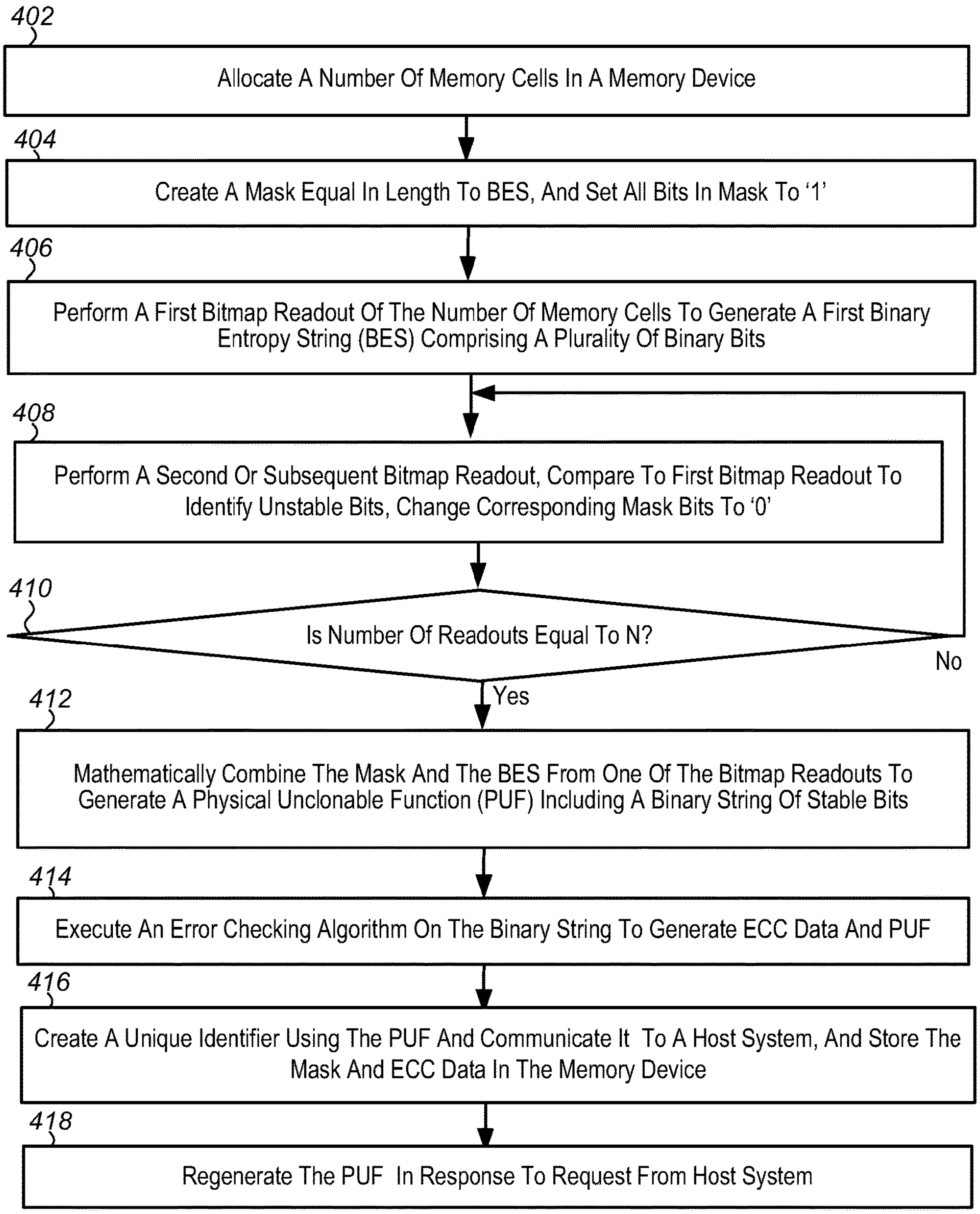
FIG. 4 is a flowchart illustrating a method for identifying unstable bits and generating a mask using multiple bitmap readouts of allocated memory cells in a memory device, generating a final PUF, and using the final PUF to uniquely identify and authenticate the memory device to a host processing system.

There are a number of methods for identifying unstable bits and generating a mask. A first method for identifying unstable bits and generating the mask includes performing multiple bitmap readouts of the allocated memory cells, and will now be described with reference to FIGS. 4 and 5. FIG. 4 is a flowchart illustrating steps of the method, while FIG. 5 is a table illustrating a number of bitmap readouts of the allocated memory cell, a mask and a final PUF generated by the method of FIG. 4. To simplify and clarify illustration of the method, the number of cells or addressable bits in the allocated memory cells was set to 32 bits from 0 to 31. However, it will be understood the number of memory cells allocated for PUF generation can be much greater, and typically includes a number of one or two bit memory cells sufficient for storing from about 32 bits to about 4 kilobits of binary data. Similarly, the number of bitmap readouts in this example was limited to five (5) to identify unstable bits. However, it will be understood that the number of bitmap readout can be increased to hundreds or more to further increase reliability in identification of unstable bits and reliability of the final PUF.

Referring to FIG. 4 the method begins with the allocation of a number of memory cells in a memory device for use in generating a PUF (step 402). As described above with reference to FIG. 3 this and the following steps of FIG. 4 are generally performed once at sort by a manufacturer of the memory device. Alternatively, the steps of PUF generation can be performed by a user in the field, for increased security. As shown in FIG. 5 each of the allocated memory cells is assigned an address from 0 to 31 corresponding to a location in a Binary Entropy String (BES) of a bit read from the cell.

Next, a mask, shown as Fuzzy Mask in FIG. 5, is then created with a total number of bits or string length equal to the number of memory cells allocated and addressed in the previous step, and all bits of the mask or mask bits set equal to a binary '1' (step 404).

A plurality of bitmap readouts are performed on the allocated memory cells resulting in a first BES as shown in Read 1 in FIG. 5 (step 406). As explained previously the bitmap readout is generally accomplished by applying an array voltage ($V_{GS}$) to gates of all the allocated memory cells and comparing a resulting drain current ($I_d$) from each memory cell (or bit) to a reference current ($I_{REF}$). Those allocated memory cells having a drain current ($I_d$) greater than the reference current ($I_{REF}$) read as a binary '1' while those with lower current are read as a binary '0'. Generally, the $V_{GS}$ is equal to the median $V_T$ for a native distribution of the number of allocated memory cells. The median $V_T$ may be previously known to the manufacturer, or may be determined by performing an initial bitmap readout against a preselected reference $V_T$ to determine the actual median $V_T$ for the number of allocated memory cells prior to beginning the method shown in FIG. 4.

Next, a second bitmap readout is performed resulting in a second BES, shown as Read 2 in FIG. 5, a comparison made between the bits of the first BES and the second BES to identify all unstable bits that have changed or flipped binary values, and the mask bits corresponding to such unstable bits changed to a binary '0' (step 408). For example, referring to FIG. 5 the number of allocated memory cells or bits at addresses 12, 18, 22 and 26 have changed, and mask bits at the corresponding addresses in the fuzzy mask are likewise changed to binary '0'. The unstable bits mask bits are shown as shaded in FIG. 5. It is noted that while the bitmap readouts is accomplished in the memory device, and the resulting BESs and fuzzy mask can be temporarily stored in the memory device, the comparison of the first and subsequent BESs is generally accomplished in a discrete test system which the manufacturer has coupled to the memory device or in a central processing unit (CPU) of a host processing system integrally fabricated with the memory device or coupled thereto.

The check is then done to determine if the total number of bitmap readouts performed is equal to a predetermined number of bitmap readouts (step 410). In the embodiment shown the predetermined number bitmap readouts is set to five (5). If the predetermined number bitmap readouts has not been performed, so step 408 is repeated. Another bitmap readout is performed, the resultant BES compare to the first BES of the first bitmap readout to identify unstable bits, and mask bits corresponding to the unstable bits changed to '0'. It is noted that the mask bits once changed to '0' are never changed back to '1' even when subsequent bitmap readouts match the first bitmap readout. For example, the bit at address 26 was marked as unstable following the second bitmap readout (Read 2), and although following a subsequent readout (Read 3) it is the same as in the first bitmap readout, i.e., binary '1', it continues to be identified in the Fuzzy Mask as an unstable bit with a mask bit of '0'.

If the number of predetermined bitmap readouts has been performed, the mask or mask string (Fuzzy Mask) and a BES resulting from the first bitmap readout, or from any one of the subsequent bitmap readout if stored, are mathematically combined to generate a Physical Unclonable Function (PUF) including a Binary String of stable bits (step 412). The resulting Binary String is shown as the Final PUF in FIG. 5. In example shown, by mathematically combined it is meant bitwise multiplication of the first BES and the fuzzy mask.

Next, an error correcting algorithm is executed on the Binary String to generate error correction code (ECC) data and a final PUF (step 414). As noted above, the final PUF can be combined with an output from a random number generator in the memory device to create a unique identifier that is communicated to a host processing system, or can itself be used as the unique identifier. In either case, the mask and ECC data—but not the final PUF or Binary String, are then stored in a secure, non-volatile location in the memory device to enable re-generation of the PUF (step 416).

Finally, the PUF can be re-produced or regenerated in the memory device at a later time in response to a request from the host processing system (step 418). Generally, reproduction or re-generation of the final PUF is accomplished by performing one or more bitmap readouts of the allocated memory cells, and mathematically combining, e.g., multiplying, the resultant Binary Entropy String (BES) with the stored fuzzy mask or mask to regenerate a PUF having a Binary String of stable bits. The error correcting algorithm is then executed or performed on the Binary String of the regenerated PUF using the ECC data to further correct any flipped or changed bits that may have been missed by the fuzzy mask or changed after mask creation.

As noted above, the mask eliminates uncertainty associated with unstable bits in a BES resulting from any subsequent bitmap readout of the allocated number of memory cells, and the ECC data insures that the previously stable bits in the Binary String have not 'flipped' or changed, the PUF can be reliably reproduced or regenerated and used to uniquely identify and authenticate the memory device to the host processing system.

In a first alternative embodiment to the method of FIGS. 4 and 5, the method can further include prior to mathematically combining the mask and first BES (step 412), performing a check to see that the fuzzy mask does not include more than a predetermined maximum number of unstable bits as indicated by the number of mask bits saved as a binary '0'. This further improves the reliability of the final PUF by ensuring that the final PUF is generated from a predetermined minimum number of stable bits in the BES. The predetermined minimum number of stable bits can be from one half to one three quarters the number bits stored in the number of allocated number of cells, or from about 16 bits to about 3 kilobits. Thus, the predetermined maximum number of unstable bits can be from one quarter to one half the number bits stored in the number of allocated number of cells, or from about 8 bits to about 1 kilobit.

In a second alternative embodiment, one or more of the plurality of bitmap readouts can be performed at a different memory device temperature. Since native threshold voltage can vary with memory device temperature, some marginally stable bits can be identified as unstable and removed from generation of the final PUF further improving reliability of the PUF. This embodiment can be particularly useful for users of the memory device, or a manufacturer of a host processing system in which the memory device is used under extreme environmental conditions or over a wide range of temperatures, such as in automotive applications.

A second method for identifying unstable bits and generating a mask and a final PUF by comparing the bitmap readouts of allocated memory cells at an upper, median +A $V_T$ and a lower, median−Δ $V_T$ will now be described with reference to FIGS. 6, 7 and 8.

Figure 6:
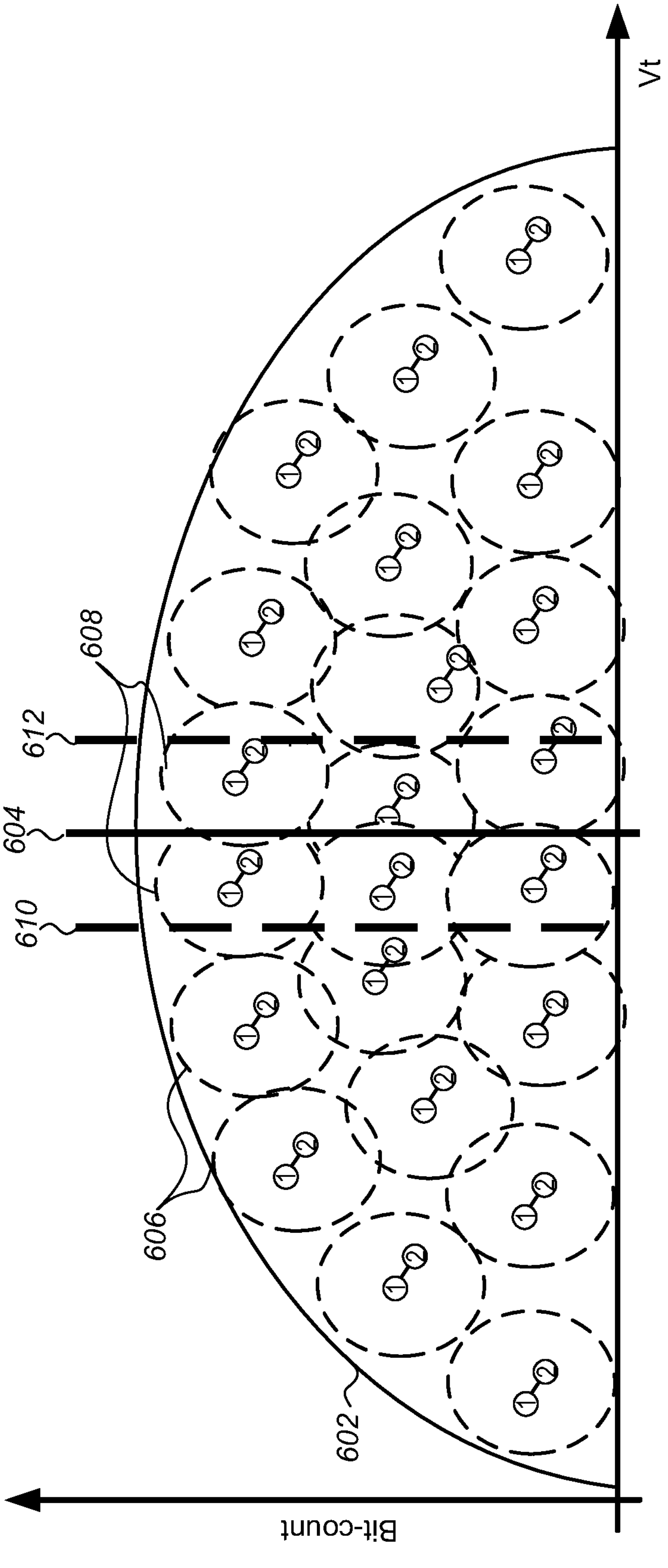
FIG. 6 is a histogram showing two successive readouts of logic values for a number of memory cells having a native $V_T$ distribution with a median $V_T$ and read versus an upper, median+Δ $V_T$ and a lower, median−Δ $V_T$.

FIG. 6 is a histogram schematically illustrating a native $V_T$ distribution for an exemplary number of memory cells allocated for PUF generation, and having a normal distribution of native $V_T$, represented by curve 602, and a reference or median $V_T$ 604. Referring to FIG. 6 the dashed bubbles or circles reflect the 'uncertainty' of the $V_T$ readouts of the exemplary memory cells while the small, solid circles numbered 1 or 2, represent the actual $V_T$ found by 2 successive readouts. Although for purposes of clarity FIG. 6 illustrates just twenty-two (22) exemplary cells, it will be understood the number of memory cells allocated for PUF generation is much greater, typically a number sufficient for storing from about 32 to about 4 kilobits (Kb) of binary data. The exemplary memory cells include a first number of cells 606 distal from the median $V_T$ 604 and likely capable of storing stable bits, and a second number of cells 608, shown in shading, near or proximal the median $V_T$ 604 and storing unstable bits. Referring again to FIG. 6, also shown is an upper, median+Δ $V_T$ 612 and a lower, median−Δ $V_T$ 610. It is noted that delta or A by which the lower $V_T$ 610 and the upper $V_T$ 612 are separated from the median $V_T$ 604, while shown as equal need not be the same in every embodiment. For example, where it is foreseen that the memory device may be used in environments where a memory device temperature can lower native threshold voltages, it may be desirable to increase the difference or A by which the lower $V_T$ 612 is separated from the median $V_T$ 604.

Figure 7:
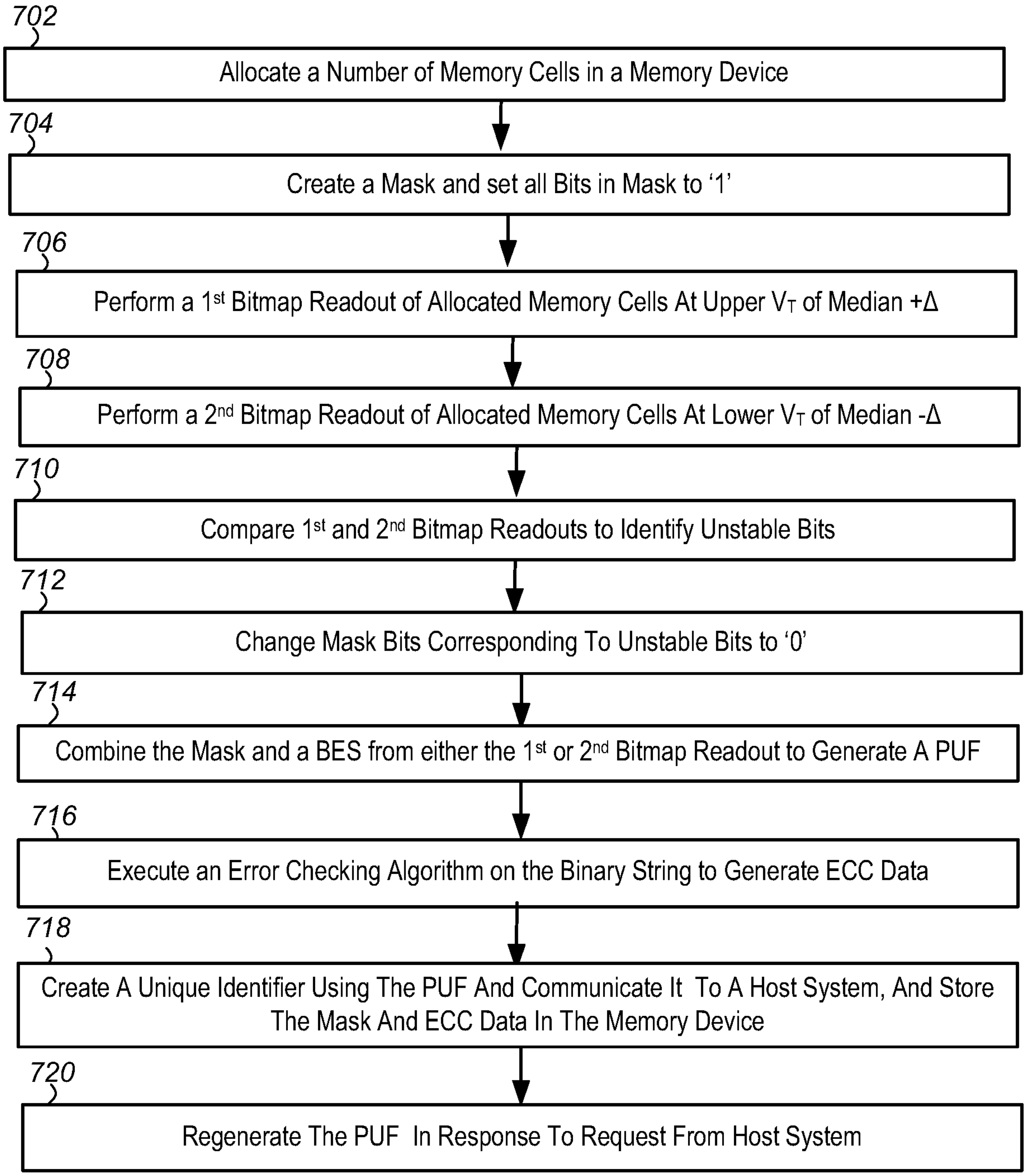
FIG. 7 is a flowchart illustrating a method generating a final PUF using the bitmap readouts of allocated memory cells of FIG. 6 upper, median+Δ $V_T$ and a lower, median−Δ $V_T$.

FIG. 7 is a flowchart illustrating steps of a method for identifying unstable bits and generating a mask and a final PUF by comparing the bitmap readouts of allocated memory cells at an upper, median+Δ $V_T$ and a lower, median−Δ $V_T$. FIG. 8 is a table illustrating a number of bitmap readouts of the allocated memory cell, a mask and a final PUF generated by the method of FIG. 7. To simplify and clarify illustration of the method, the number of cells or addressable bits in the allocated memory cells was set to 32 bits from 0 to 31. However, it will be understood the number of memory cells allocated for PUF generation can be much greater, and typically includes a number of one or two bit memory cells sufficient for storing from about 32b to about 4 Kb of binary data.

Referring to FIG. 7 the method begins with the allocation of a number of memory cells in a memory device for use in generating a PUF (step 702). As described above with reference to FIGS. 3 and 4, the allocated cells can include native memory cells or previously programed and erased memory cells, and are rendered read-only, so that they cannot be accidentally programmed or erased in subsequent operations and rendered unsuitable for future PUF generation or re-generation. It is further noted that this allocation step (step 702), and the following steps of FIG. 7 are generally performed once by the manufacturer at sort or at final test of a system incorporating the memory device, or at later point in time in the field by the user. As shown in FIG. 8 each of the allocated memory cells is assigned an address from 0 to 31 corresponding to a location in a Binary Entropy String (BES) of a bit read from the cell. It will be understood that as the number of allocated memory cells need not be physically adjacent to one another these addresses are logical addresses.

Next, a mask, shown as Fuzzy Mask in FIG. 8, is created with a total number of bits or string length equal to the number of memory cells allocated and addressed in the previous step, and all bits of the mask or mask bits set equal to a binary '1' (step 704).

A first bitmap readout is then performed on the allocated memory cells at an upper $V_T$ of median+delta (Δ) resulting in a first BES shown as Read Median+delta in FIG. 8 (step 706). As explained previously the bitmap readout is generally accomplished by applying an array voltage ($V_{GS}$) to gates of all the allocated memory cells and comparing a resulting drain current ($I_d$) from each memory cell (or bit) to a reference current ($I_{REF}$). Those allocated memory cells having a drain current ($I_d$) greater than the reference current ($I_{REF}$) read as a binary '1' while those with lower current are read as a binary '0'. In this embodiment, the Vas is equal to the median $V_T$ for a native distribution of the number of allocated memory cells plus a + delta (Δ) voltage. Generally, the + delta (Δ) is a predetermined voltage between from about 50 to about 500 millivolts (mV) selected ensure all unstable bits are identified when the number of native cells are subsequently readout at a $V_{GS}$ equal to the median $V_T$. As in embodiments described above the median $V_T$ may be previously known to the manufacturer, or may be determined by performing an initial bitmap readout against a preselected reference $V_T$ to determine the actual median $V_T$ for the number of allocated memory cells prior to beginning the method shown in FIG. 7.

A second bitmap readout is performed on the allocated memory cells at a lower $V_T$ of median-delta (Δ) resulting in a second BES shown as Read Median-delta in FIG. 8 (step 708). As noted above, the −delta (Δ) is a predetermined voltage selected between 50 and 500 mV. As also noted above, the −delta (Δ) may be equal in magnitude to the +delta (Δ), but need not be in every embodiment.

Next, the second bitmap readout (Read Median-delta) is compared to the first bitmap readout (Read Median+delta) and unstable bits identified (step 710). The unstable bits are those addresses that have a flipped readout result, either from '1' to '0' or vice versa, between the first bitmap readout (Read Median+delta) and the second bitmap readout (Read Median-delta). Refereeing, to FIG. 8, unstable bits are shown in the Read Median-delta as shaded bits at the 3, 11, 12, 14, 17, 18, 20, 22 and 24-26 addresses. As noted above, while the first and second bitmap readouts are accomplished using control circuitry in the memory device, and the Binary Entropy Strings or BESs resulting from the bitmap readouts and the fuzzy mask can be temporarily stored in the memory device, the comparison of the first and second bitmap readouts is generally accomplished in a discrete test system which the manufacturer has coupled to the memory device or in a central processing unit (CPU) of a host processing system integrally fabricated with the memory device or coupled thereto.

Mask bits corresponding to the unstable bits identified are then changed to a binary '0' (step 712), and the Mask and a BES from either the first or second bitmap readout mathematically combined to generate a Final Physical Unclonable Function (PUF) including a Binary String of stable bits (step 714). Next, an error correcting algorithm is executed on the Binary String to generate error correction code (ECC) data and the Final PUF (step 716). The resulting Binary String is shown as the Final PUF in FIG. 8. In example shown, by mathematically combined it is meant bitwise multiplication of the BES from either the first or second bitmap readout with the fuzzy mask. Finally, the final PUF is used to create a unique identifier, which is communicated to a host processing system where it is associated with the memory device, and the mask and ECC data—but not the stable Binary String or final PUF, are then stored in a secure, non-volatile location in the memory device (step 718).

The PUF can be re-produced or regenerated in the memory device at a later time in response to a request from the host processing system to uniquely identify and authenticate the memory device to the host processing system (step 720). Generally, reproduction or re-generation of the final PUF is accomplished by performing a bitmap readout of the allocated memory cells at a $V_{GS}$ equal to the median $V_T$, and mathematically combining, e.g., multiplying, the resultant Binary Entropy String (BES) with the stored fuzzy mask or mask to regenerate a PUF having a Binary String of stable bits. The error correcting algorithm is then executed or performed on the Binary String of the regenerated PUF using the ECC data to further correct any flipped or changed bits that may have been missed by the fuzzy mask or changed after mask creation.

As noted above, the mask eliminates uncertainty associated with unstable bits in a BES resulting from any subsequent bitmap readout of the allocated number of memory cells, and the ECC data insures that the previously stable bits in the Binary String have not 'flipped' or changed, the PUF can be reliably reproduced or regenerated and used to uniquely identify and authenticate the memory device to the host processing system.

In a first alternative embodiment to the method of FIGS. 7 and 8, the method can further include prior to mathematically combining the mask and BES (step 714), performing a check to see that the fuzzy mask does not include more than a predetermined maximum number of unstable bits as indicated by the number of mask bits saved as a binary '0'. This further improves the reliability of the final PUF by ensuring that it is generated from at least a predetermined minimum number of stable bits in the BES. As described above, the predetermined minimum number of stable bits can be from one half to one three quarters the number bits stored in the number of allocated number of cells, or from about 16 bits to about 3 kilobits. Thus, the predetermined maximum number of unstable bits can be from one quarter to one half the number bits stored in the number of allocated number of cells, or from about 8 bits to about 1 kilobit.

In a second alternative embodiment, the first bitmap readout (step 706) and the second bitmap readout (step 708) can be repeated at a different memory device temperature. Since native threshold voltage can vary with memory device temperature, some marginally stable bits can be identified as unstable and removed from generation of the final PUF further improving reliability of the PUF. This embodiment can be particularly useful for users of the memory device, or a manufacturer of a host processing system in which the memory device is used under extreme environmental conditions or over a wide range of temperatures, such as in automotive applications.

An secure system 900 including a host processor or system 902 and a secure memory device 904 configured and operable to generate a PUF for identifying and authenticating the memory device to the host processing system to improve data security will now be described with reference to FIG. 9.

Figure 9:
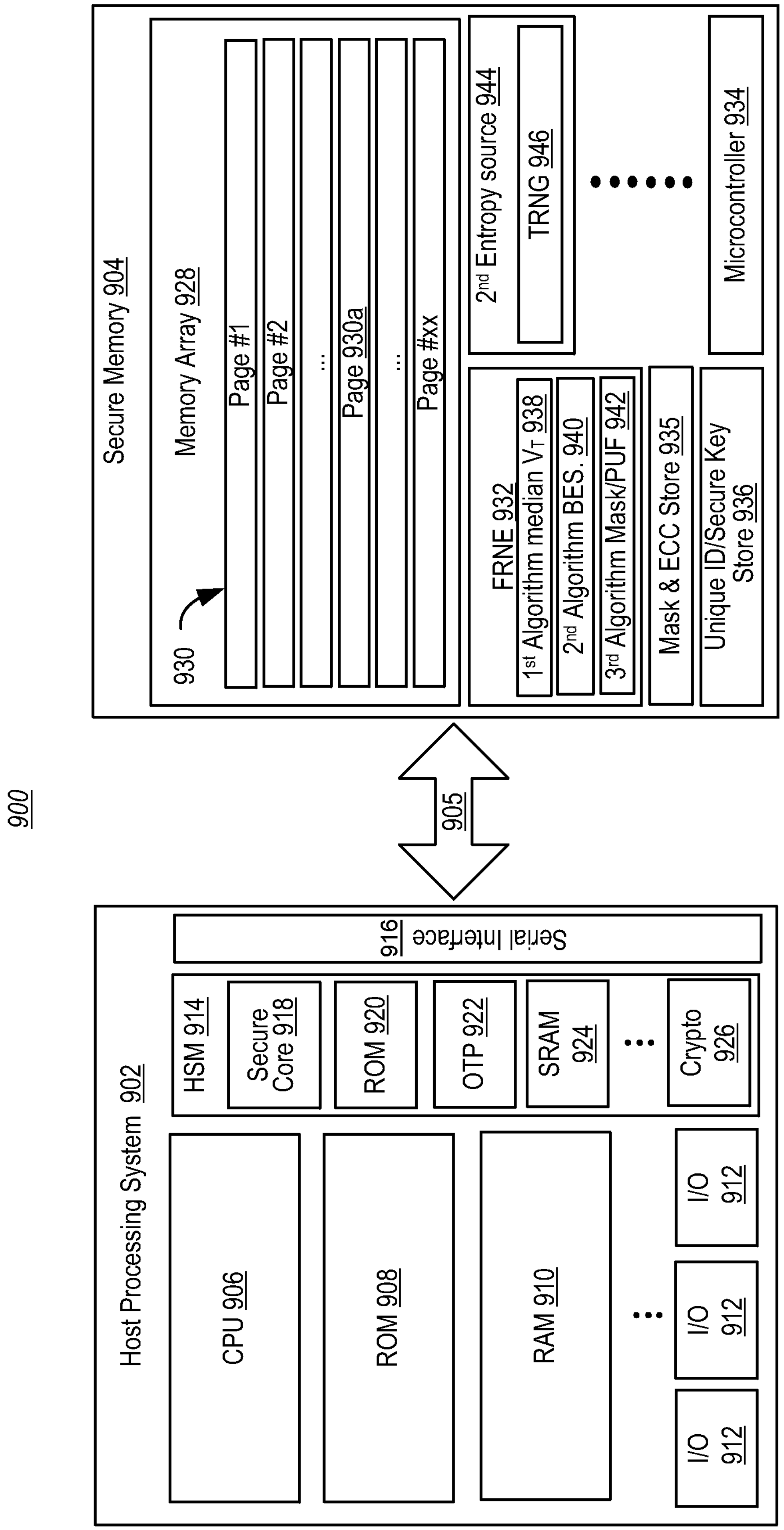
FIG. 9 is a simplified block diagram of an secure system including a host processing system and a secure memory device configured and operable to generate a PUF for identifying and authenticating the memory device to the host processing system to improve data security.

Referring to FIG. 9 the secure system 900 includes a host processing system 902 and a secure memory device 904 coupled through a data bus 905. The host processing system 902 generally includes a central processing unit (CPU 906), read-only memory (ROM 908) storing programs and algorithms, random access memory (RAM 910), a number of input/output interfaces (I/O 912), an optional hardware security module (HSM 914) and a serial peripheral interface (SPI 916) through which the host processing system communicates with the secure memory device 904. The host processing system 902 can be integrally formed as a single integrated circuit (IC) or System on Chip (SoC), as in the embodiment shown, or as a number of interconnected discrete components. The HSM 914) generally includes a secure core 918 for executing programs and algorithms relating to secure communication with the secure memory device 904, a read-only memory (ROM 920) storing such programs and algorithms, a one-time-password module (OTP 922) for storing and verifying a OTP, random access memory (RAM 924), and a crypto module or engine (Crypto 926).

The secure memory device 904 generally includes a memory array 928 having a number of portions or blocks 930 of memory cells, at least one of which is a native block 930*a*, in which the memory cells included therein have not been written to since fabrication, reserved or allocated for generating a PUF according to one of the above described methods. The secure memory device 904 further includes a flash random number extraction (FRNE 932) having stored in registers or memories therein programs or algorithms for generating the mask, ECC data and final PUF, a microcontroller 934 for executing the programs or algorithms for generating the mask, ECC data and final PUF and for generating security keys from the final PUF, a secure store 935 in the secure memory device 904 for storing the mask and ECC data, and, optionally, a secure key store 936 for storing the security keys used to control access to the memory device.

Generally, the FRNE 932 can include a first memory or register 938 having stored therein an algorithm for locating a reference at a median of threshold voltages ($V_T$) of memory cell in the native block 930*a*, a 2nd memory or register 940 having stored therein an algorithm for obtaining a Binary Entropy String (BES) using variations of native threshold voltages of memory cells in the native block, and a 3rd memory or register 942 having stored therein an algorithm for generating the mask and final PUF using the BES. In one embodiment, the algorithm for obtaining the BES includes instructions for reading the number of allocated memory cells versus the reference voltage, and assigning each of the number of allocated memory cells having a threshold voltages above the reference voltage a first binary bit value, '0', and each of the remaining memory cells as a second binary bit value, '1'.

In some embodiment, such as that shown, the secure memory device 904 further includes a second entropy source 944, such as a True Random Number Generator (TRNG 946) implemented using a timer or clock in the secure NVM and a TRNG algorithm stored in the TRNG, for generating a binary number output that is concatenated with final PUF and mathematically manipulated by the microcontroller 934 to generate a unique identifier or secure keys, that is communicated to the host processing system 902.

It will be understood that the above described methods of using native variations in threshold voltages for memory cells as an entropy source for generation of a PUF while described in detail with respect to flash type memory devices, can be applied or extended to other types of semiconductor memories exhibiting a random distribution in threshold voltages, even when not due to process variations in allocated memory cells.

Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:

allocating a number of memory cells in a memory device;

configuring the number of memory cells to be read only;

perform a plurality of read operations to generate bitmap readouts of the number of allocated memory cells at a median of a native threshold voltages ($V_T$) distribution of the number of allocated memory cells to generate a plurality of Binary Entropy Strings, each comprising a plurality of binary bits;

identifying a number of unstable bits in the plurality of Binary Entropy Strings, further comprising:

determining an upper threshold voltage ($V_T+\Delta$) a first predetermined voltage above the median of the $V_T$ distribution of the cells;

determining a lower threshold voltage ($V_T-\Delta$) a second predetermined voltage below the median of the $V_T$ distribution of the cells;

performing at least two successive bitmap readouts of the number of allocated memory cells, including one at $V_T$+A and one at $V_T-\Delta$; and identifying as an unstable bit any bit read from an allocated memory cell having a binary value that changes between the at least two successive bitmap readouts;

generating a mask of memory cell addresses associated with the number of unstable bits, the mask operable to cause the number of unstable bits to be ignored on subsequent bitmap readouts of the number of allocated memory cells;

mathematically combining the mask and one of the plurality of Binary Entropy Strings from one of the plurality of bitmap readouts to generate a Physical Unclonable Function (PUF) comprising a Binary String of stable bits;

executing an error correcting algorithm on the Binary String of stable bits to generate Error Correction Code (ECC) data; and storing the mask and ECC data in the memory device.

2. The method of claim 1 wherein identifying the number of unstable bits comprises comparing the plurality of Binary Entropy Strings and identifying as an unstable bit any bit read from an allocated memory cell that has a binary value different from that in a preceding bitmap readout.

3. The method of claim 2 wherein performing the plurality of bitmap readouts comprises performing a predetermined number of bitmap readouts.

4. The method of claim 2 wherein performing the plurality of bitmap readouts comprises performing at least a first number of bitmap readouts at a first temperature and a second number of bitmap readouts at a second temperature, wherein the first and second temperatures are different.

5. The method of claim 1 further comprising;

performing a third bitmap readout at the upper threshold voltage ($V_T+\Delta$) and a fourth bitmap readout at the lower threshold voltage ($V_T-\Delta$), with the memory device at a different temperature from that at which preceding bitmap readouts were performed; and identifying as an unstable bit any bit read from an allocated memory cell that has a binary value that changes between the third and fourth bitmap readouts.

6. The method of claim 1 wherein generating the mask comprises generating a mask string comprising a plurality of binary bits, equal to a number of the plurality of bits in the plurality of Binary Entropy Strings, wherein the binary bits in the mask string corresponding to the number of unstable bits are set to '0', and wherein mathematically combining the mask and one of the plurality of Binary Entropy Strings comprises multiplying the binary bits of the mask string with corresponding bits in the Binary Entropy String.

7. The method of claim 1 further comprising determining that the number of unstable bits is less than a first predetermined number, and the PUF comprises a Binary String of stable bits of a second predetermined number or more.

8. The method of claim 1 further comprising regenerating the PUF to identify the memory device to a host processing system, wherein said regenerating includes:

performing a subsequent bitmap readout of the allocated memory cells after storing the mask and ECC data in the memory device;

mathematically combining the Binary Entropy String resulting from the subsequent bitmap readout with the stored mask to regenerate the PUF; and identifying and correcting any changed bits in the regenerated PUF using the ECC data.

9. A memory device comprising:

an array of memory cells including a number of memory cells allocated for generating a Physical Unclonable Function (PUF); and a microcontroller operable to execute algorithms to:

perform a plurality of read operations to generate bitmap readouts of the number of allocated memory cells at a median of a threshold voltages ($V_T$) distribution of the number of allocated memory cells to generate a plurality of Binary Entropy Strings, each comprising a plurality of binary bits;

identify a number of unstable bits in the plurality of Binary Entropy Strings, further comprising:

determining an upper threshold voltage ($V_T+\Delta$) a first predetermined voltage above the median of the $V_T$ distribution of the cells;

determining a lower threshold voltage ($V_T-\Delta$) a second predetermined voltage below the median of the $V_T$ distribution of the cells;

performing at least two successive bitmap readouts of the number of allocated memory cells, including one at $V_T+\Delta$ and one at $V_T-\Delta$; and identifying as an unstable bit any bit read from an allocated memory cell having a binary value that changes between the at least two successive bitmap readouts;

generate a mask of memory cell addresses associated with the number of unstable bits, the mask operable to cause the number of unstable bits to be ignored on subsequent bitmap readouts of the number of allocated memory cells;

mathematically combine the mask and one of the plurality of Binary Entropy Strings from one of the plurality of bitmap readouts to generate a Physical Unclonable Function (PUF) comprising a Binary String of stable bits;

execute an error correcting algorithm on the Binary String of stable bits to generate Error Correction Code (ECC) data; and store the mask and ECC data in the memory device, wherein the number of memory cells allocated for generating the PUF are configured to be read only.

10. The memory device of claim 9 wherein the microcontroller is further operable to regenerate the PUF to identify the memory device to a host processing system by executing algorithms to:

perform a subsequent bitmap readout of the allocated memory cells after storing the mask and ECC data in the memory device;

mathematically combine the Binary Entropy String resulting from the subsequent bitmap readout with the stored mask to regenerate the PUF; and identifying and correcting any changed bits in the regenerated PUF using the ECC data.

11. The memory device of claim 9 wherein the microcontroller is operable to execute an algorithm to perform a plurality of bitmap readouts including at least a first number of bitmap readouts at a first temperature and a second number of bitmap readouts at a second temperature, wherein the first and second temperatures are different.

12. The memory device of claim 9 wherein the microcontroller is further operable to execute an algorithm to perform at least two additional bitmap readouts of the number of allocated memory cells at $V_T+\Delta$ and at $V_T-\Delta$, with the memory device at a temperature different from that at which the first and second bitmap readouts were performed.

13. The memory device of claim 12, wherein:

the number of memory cells allocated for generating the PUF comprises one of native memory cells, pre-programmed memory cells, or pre-erased memory cells.

14. A system comprising:

a secure memory device including an array of memory cells having a number of memory cells allocated for generating a Physical Unclonable Function (PUF), and a microcontroller; and a host processing system including a processor, memory and an interface operable to communicate with the secure memory device, wherein the microcontroller is operable to execute algorithms to:

perform a plurality of read operations to generate bitmap readouts of the number of allocated memory cells at a median of a native threshold voltages ($V_T$) distribution of the number of allocated memory cells to generate a plurality of Binary Entropy Strings, each comprising a plurality of binary bits;

identify a number of unstable bits in the plurality of Binary Entropy Strings, further comprising:

determining an upper threshold voltage ($V_T+\Delta$) a first predetermined voltage above the median of the $V_T$ distribution of the cells;

determining a lower threshold voltage ($V_T-\Delta$) a second predetermined voltage below the median of the $V_T$ distribution of the cells;

performing at least two successive bitmap readouts of the number of allocated memory cells, including one at $V_T+\Delta$ and one at $V_T-\Delta$; and identifying as an unstable bit any bit read from an allocated memory cell having a binary value that changes between the at least two successive bitmap readouts;

generate a mask of memory cell addresses associated with the number of unstable bits, the mask operable to cause the number of unstable bits to be ignored on subsequent bitmap readouts of the number of allocated memory cells;

mathematically combine the mask and one of the plurality of Binary Entropy Strings from one of the plurality of bitmap readouts to generate a Physical Unclonable Function (PUF) comprising a Binary String of stable bits;

execute an error correcting algorithm on the Binary String of stable bits to generate Error Correction Code (ECC) data; and store the mask and ECC data in the memory device, wherein the number of memory cells allocated for generating the PUF are configured to be read only.

15. The system of claim 14 wherein on receipt of a request from the host processing system the microcontroller is further operable to regenerate the PUF to identify the memory device to the host processing system by executing algorithms to:

perform a subsequent bitmap readout of the allocated memory cells after storing the mask and ECC data in the memory device;

mathematically combine the Binary Entropy String resulting from the subsequent bitmap readout with the stored mask to regenerate the PUF; and identifying and correcting any changed bits in the regenerated PUF using the ECC data.

16. The system of claim 14 wherein the microcontroller is operable to execute an algorithm to perform a plurality of bitmap readouts including at least a first number of bitmap read outs at a first temperature and a second number of bitmap readouts at a second temperature, wherein the first and second temperatures are different.

17. The system of claim 14 wherein the microcontroller is further operable to execute an algorithm to perform at least two additional bitmap readouts of the number of allocated memory cells at $V_T+\Delta$ and at $V_T-\Delta$, with the memory device at a temperature different from that at which the first and second bitmap readouts were performed.

* * * * *